(12) United States Patent
Matsuo et al.

(10) Patent No.: US 9,107,381 B2
(45) Date of Patent: Aug. 18, 2015

(54) LIQUID-PERMEABLE PANEL

(75) Inventors: Takayuki Matsuo, Kagawa (JP);
Tomoko Hirao, Kagawa (JP)

(73) Assignee: Uni-Charm, Ehime (JP)

( * ) Notice: Subject to any disclaimer, the term of this patent is extended or adjusted under 35 U.S.C. 154(b) by 7 days.

(21) Appl. No.: 13/806,251

(22) PCT Filed: Jun. 24, 2011

(86) PCT No.: PCT/JP2011/064546
§ 371 (c)(1),
(2), (4) Date: Dec. 21, 2012

(87) PCT Pub. No.: WO2011/162377
PCT Pub. Date: Dec. 29, 2011

(65) Prior Publication Data
US 2013/0098301 A1    Apr. 25, 2013

(30) Foreign Application Priority Data
Jun. 25, 2010   (JP) ................................. 2010-145700

(51) Int. Cl.
*A01K 1/01*    (2006.01)

(52) U.S. Cl.
CPC .............. *A01K 1/0107* (2013.01); *A01K 1/0114* (2013.01)

(58) Field of Classification Search
CPC . A01K 1/0107; A01K 1/0114; A01K 1/0157; A01K 15/024
USPC .......... 119/161, 165, 166, 167, 169, 529, 530
IPC ............... A01K 29/00, 1/03, 1/01, 1/035, 1/015
See application file for complete search history.

(56) References Cited

U.S. PATENT DOCUMENTS 3,486,485 A * 12/1969 Kahanick ...................... 119/706
5,353,743 A * 10/1994 Walton .......................... 119/166
(Continued)

FOREIGN PATENT DOCUMENTS

| JP | 2593792 B | 12/1996 |
| JP | 3052759 U | 7/1998 |

(Continued)

OTHER PUBLICATIONS

Machine translation of JP 2003-164234 to Mori, published Jun. 2003.*
International Search Report based on corresponding PCT application No. PCT/JP2011/064546 dated Jul. 26, 2011 (2 pgs).

*Primary Examiner* — Kathleen Alker
(74) *Attorney, Agent, or Firm* — Brinks Gilson & Lione

(57) ABSTRACT

A liquid-permeable panel that is of a system toilet for animals and that can prevent urine wetting resulting from torsion or folding over of a pee pad. The liquid-permeable panel covers the excrement containment section of the system toilet for animals. Of the aforementioned panel, the side-surface 1 cm compression deformation load, which is the load necessary for at least 1 cm of torsion to arise with respect to load from the side-surface direction that is perpendicular to the direction of thickness of the panel, is at least 5 N and no greater than 20 N. Preferably, the liquid-permeable panel has a plurality of holes that penetrate the liquid-permeable panel in the direction of thickness, and has as a material corrugated cardboard in which liquid goes through the aforementioned plurality of holes, passing through in the direction of thickness of the aforementioned liquid-permeable panel.

4 Claims, 6 Drawing Sheets

(56) References Cited

U.S. PATENT DOCUMENTS

| | | | |
|---|---|---|---|
| 5,465,686 A * | 11/1995 | Monetti et al. | 119/168 |
| 5,799,610 A * | 9/1998 | Poulos | 119/166 |
| 7,584,717 B2 * | 9/2009 | Skovron et al. | 119/165 |
| 2003/0150393 A1 | 8/2003 | Otsuji et al. | |
| 2007/0068461 A1 * | 3/2007 | Hill | 119/166 |
| 2012/0006275 A1 * | 1/2012 | Brenner | 119/169 |

FOREIGN PATENT DOCUMENTS

| | | | | |
|---|---|---|---|---|
| JP | 2002-142599 A | | 5/2002 | |
| JP | 2003-164234 | * | 6/2003 | ............ A01K 13/00 |
| JP | 2003-235389 A | | 8/2003 | |
| JP | 3609855 B | | 10/2004 | |

* cited by examiner

LIQUID-PERMEABLE PANEL

RELATED APPLICATION

This application is a 35 U.S.C. §371 national phase filing of International Patent Application No. PCT/JP2011/064546 filed Jun. 24, 2011, to which priority is claimed under 35 U.S.C. §120 and through which priority is claimed under 35 U.S.C. §119 to Japanese Patent Application No. 2010-145700, filed Jun. 25, 2010.

TECHNICAL FIELD

The present invention relates to a disposable liquid-permeable panel used, for example, in a system toilet for animals such as a dog.

BACKGROUND ART

A system toilet for animals which can be disposed in a room is used in order to manage excrement of an animal that inhabits the room. Recently, toilets for animals include an animal toilet in which a commercially available pee pad for toilet use is laid directly onto the floor surface and fixed by an outer frame by pressing the outer periphery of the pee pad (Patent Document 1), and an animal toilet in which a shallow toilet tray contains a plate-shaped urine-absorbent mat and a liquid-permeable non-woven fabric that is tightly attached to and covers the whole upper surface of the urine-absorbent mat (Patent Document 2).

However, the toilet for animals described above uses a low-rigidity sheet member configured from a non-woven fabric in a section on which the animal directly mounts and therefore often results in "torsion" or "folding over" of the sheet member due to a jumping into the toilet or a revolving motion habitually performed by a dog when excreting termed "circling (smell-removing)" in the toilet before excreting.

Patent Document 1: Japanese Patent Publication No. 3609855

Patent Document 2: Japanese Unexamined Patent Application, Publication No. 2002-142599

DISCLOSURE OF THE INVENTION

Problems to be Solved by the Invention

Torsion or folding over is produced due to the larger load of the feet of the animal than expected. For example, when the animal weight is assumed to be 10 kg and the size of the feet 10 $cm^2$, the load per foot is of the order of 2.5 kg. This level of load is associated with the possibility of "torsion" or "folding over" as described above when a panel configured with liquid-permeable holes is used for example as a detachable and disposable member that is disposed in a section on which the animal directly mounts. In addition, there is a risk of the further problem that the liquid-permeable characteristics are reduced during use due to collapse of the holes due to the load.

In this manner, in relation to the member disposed on a section on which the animal directly mounts in the toilet for animals, no consideration has been given to the issue of the strength of the member itself in a toilet for animals that uses a low-rigidity sheet member in order to deal with the large load applied when the dog habitually performs a revolving motion in the toilet prior to excretion or when the dog jumps into the toilet.

Consequently, the present invention has the object of providing a liquid-permeable panel that is mounted on a section of a toilet for animals on which the animal directly mounts, that is configured as a exchangeable and disposable type that exhibits liquid-permeable characteristics in relation to excrement and facilitates cleaning operations, and that does not exhibit "torsion", "folding over" or "hole blockage" in contrast to a sheet member.

Means for Solving the Problems

The present inventors conducted diligent research to solve the above problems. As a result, the present invention was completed with the insight that when using a liquid-permeable panel exhibiting predetermined liquid-permeable characteristics, the provision of a predetermined strength in relation to a load from a panel-side-surface direction that is perpendicular to the holes rather than a load from a panel-surface direction that is parallel to the holes is effective in preventing "torsion", "folding over" or "hole blockage" as described above. More specifically, the present invention includes the following features.

(1) A liquid-permeable panel is disposed on a section on which an animal directly mounts in a toilet for animals and a 1 cm compressive deformation load on a side surface of the liquid-permeable panel as defined below is at least 0.35 N and no greater than 20 N.

1 cm compressive deformation load on a side surface: load for 1 cm deformation of liquid-permeable panel when applying compressive load at a velocity of 500 mm/min from a side surface direction that is perpendicular to a thickness direction of the liquid-permeable panel with a circular plunger having a distal end with a diameter of 10 mm.

(2) According to the liquid-permeable panel as described in (1), the liquid-permeable panel is a liquid-permeable panel which is a corrugated cardboard that includes a plurality of holes penetrating in the thickness direction of the liquid-permeable panel, such that a liquid permeates in the thickness direction of the liquid-permeable panel through the plurality of holes.

(3) According to the liquid-permeable panel as described in (2), the corrugated cardboard is configured by cutting of a block obtained by lamination of a sheet member which forms the corrugated cardboard in a predetermined thickness in a direction that is perpendicular to the direction of penetration of the holes.

(4) According to the liquid-permeable panel as described in any one of (1) to (3), the liquid-permeable panel has a liquid permeation rate of at least 90%.

(5) A system toilet for animals includes an excrement receptacle having an excrement containment section, and a liquid-permeable panel according to any one of (1) to (4) disposed detachably in an upper space of the excrement containment section.

Effects of the Invention

According to the present invention, a liquid-permeable panel of a toilet for animals prevents urine wetting due to torsion or folding over and that prevents a reduction in liquid-permeable characteristics due to hole blockage.

PREFERRED MODE FOR CARRYING OUT THE INVENTION

The preferred aspects of the present invention will be described below making reference to the figures. The embodiments of the present invention are not limited in any manner to the following embodiments, nor is the technical scope of the present invention limited thereby.
Overall Structure Firstly the overall structure of a system toilet 1 for animals will be described making reference to the system toilet 1 for animals that is an embodiment of the present invention.

Figure 1:
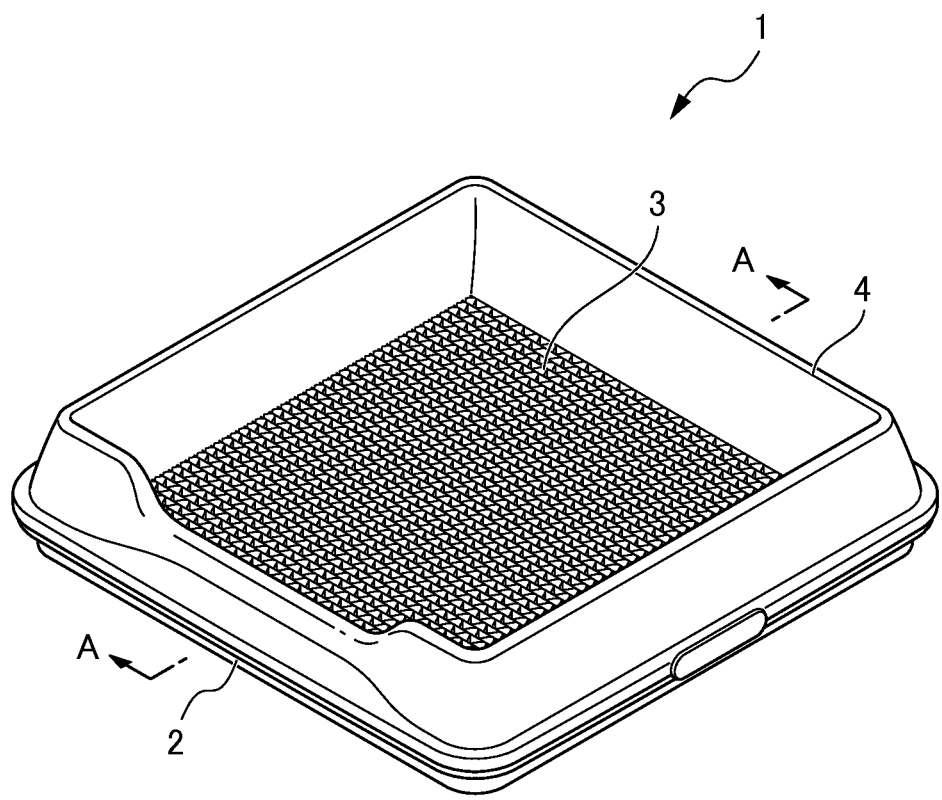
FIG. 1 is a perspective view of a system toilet for animals according to the present embodiment.
Figure 2:
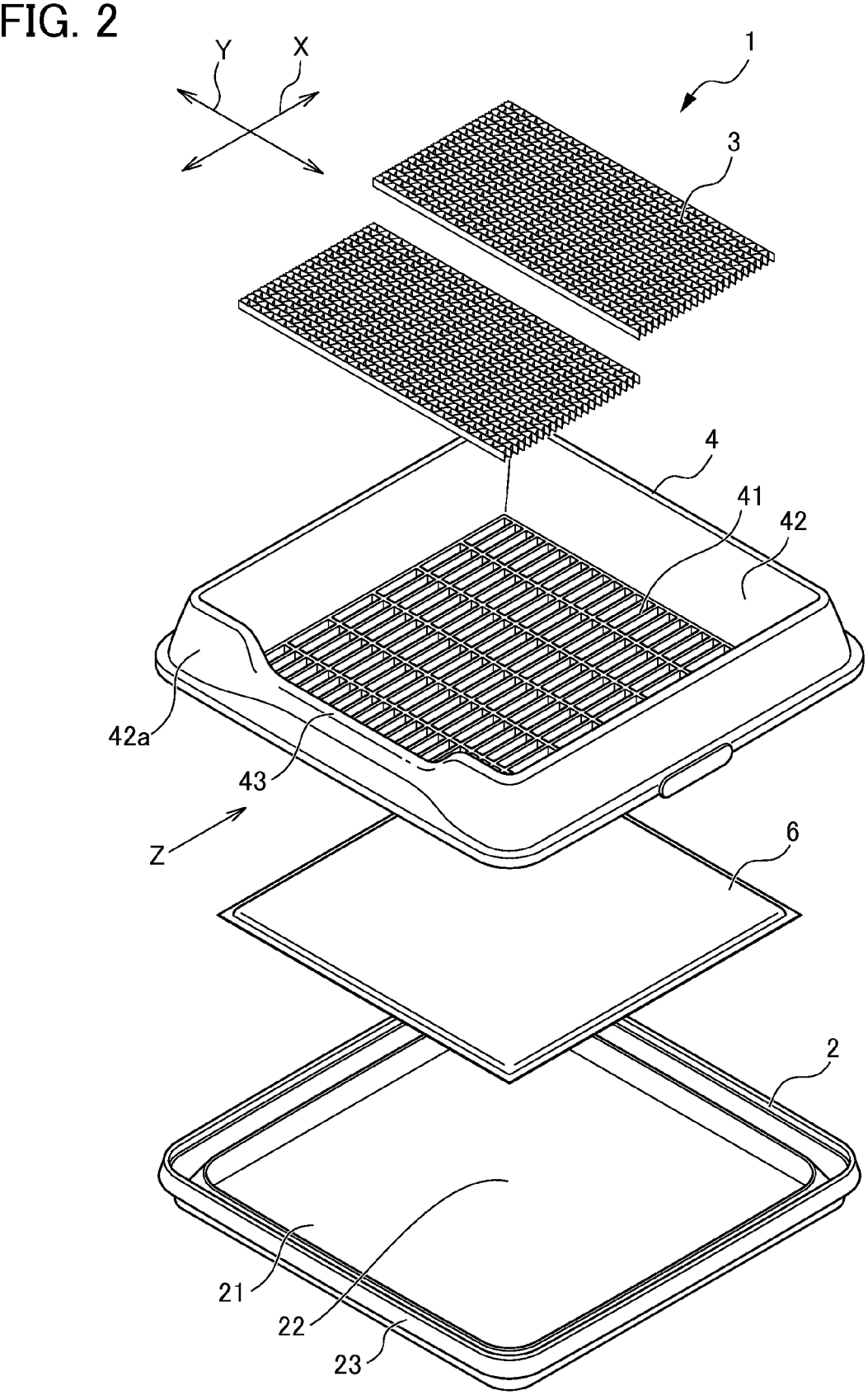
FIG. 2 is an exploded perspective view illustrating the system toilet for animals according to the present embodiment.

As illustrated in FIG. 1 and FIG. 2, the system toilet 1 for animals according to the present embodiment includes an excrement receptacle 2 that opens at a upper surface and that has an excrement containment section 21 that can contain an absorbent member that exhibits water-absorbent characteristics such as an absorbent sheet 6 or the like; an upper receptacle 4 that is disposed on an upper section of the excrement receptacle 2 and that includes a bottom surface that is configured to cover the open upper surface of the excrement receptacle 2; and a liquid-permeable panel 3, disposed (mounted) on the bottom surface section 41 of the upper receptacle 4.

As illustrated in FIG. 2, the excrement receptacle 2 includes a substantially square bottom surface section 22 and four side wall sections 23 that rise from the four sides of the bottom surface section with a predetermined rise angle with respect to the bottom surface section 22. The excrement containment section 21 is formed by the space enclosed by the bottom surface section 22 and the four side wall sections 23. The excrement containment section 21 can contain urine or the like that is excreted by an animal.

Figure 3:
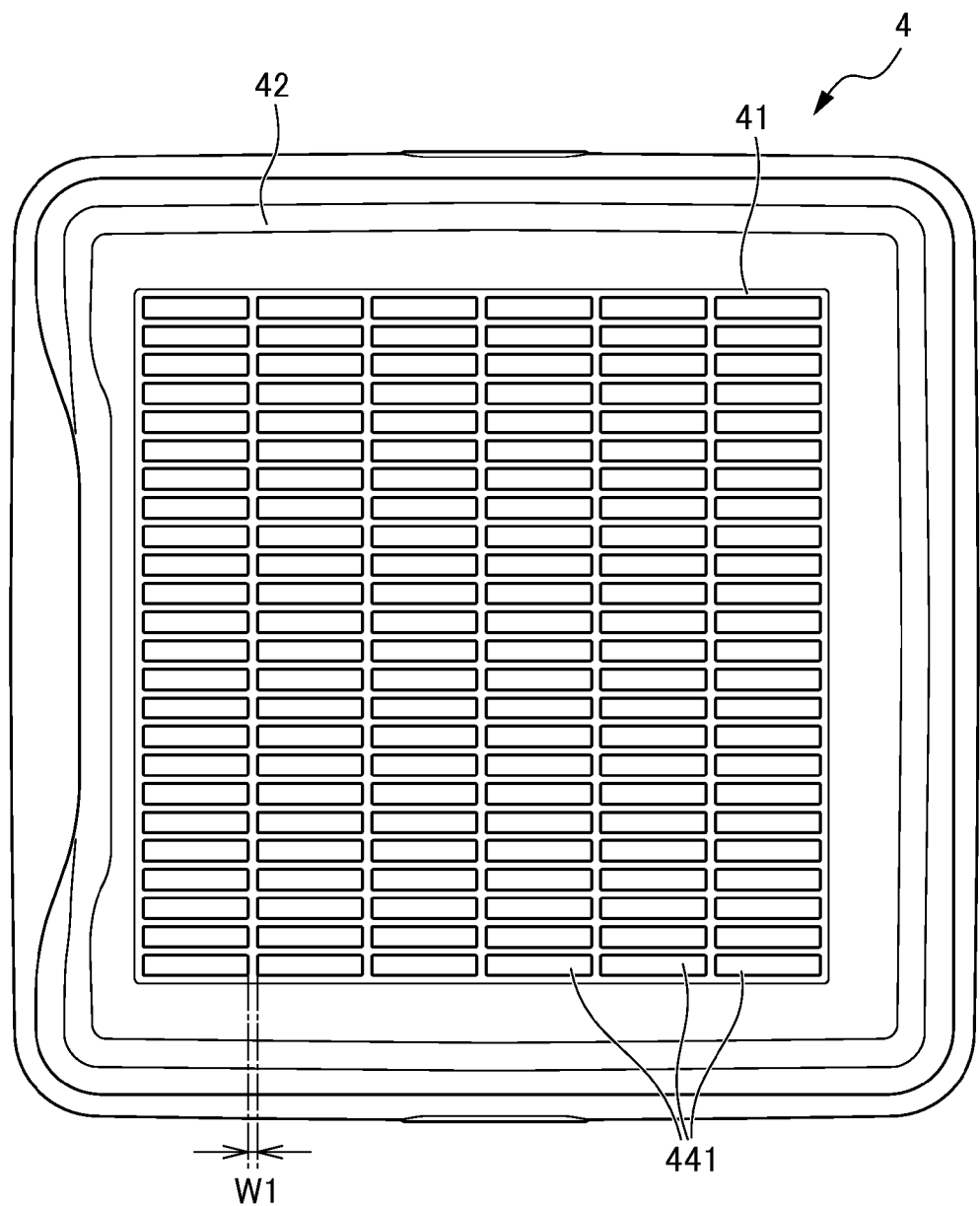
FIG. 3 is a plan view of the system toilet for animals with the liquid-permeable panel removed in the system toilet for animals according to the present embodiment.

As illustrated in FIG. 2 and FIG. 3, the upper receptacle 4 is configured with an open upper surface, and includes a support section 41 that is configured with a substantially square bottom surface when viewed in plan, and four upper side wall sections 42 that rise with a predetermined rise angle with respect to the support section 41 respectively from the four sides of the support section 41.

As illustrated in FIG. 3, the support section 41 has a lattice-shaped configuration that includes a plurality of through holes 441, and exhibits permeable characteristics in relation to a liquid such as urine. The plurality of through holes 441 is configured in a rectangular shape, and is disposed respectively with a predetermined interval in relation to the directions of the rows and columns.

The dimensions of the plurality of through holes 441 preferably are a length on one side of 1 mm to 100 mm and more preferably 10 mm to 60 mm in light of maintaining suitable liquid-permeable characteristics.

The width W1 of the lattice-shaped section in the support section 41 (as illustrated in FIG. 3) is preferably 1 mm to 10 mm, and more preferably 2 mm to 6 mm in order to maintain suitable liquid permeable characteristics and maintain the strength of the support section 41.

The thickness D1 of the support section 41 (illustrated in FIG. 4) is preferably 1 mm to 10 mm in order to maintain the strength of the support section 41.

The height of three upper side wall sections 42 of the four upper side wall sections 42 is configured to be substantially equal. A gateway part 43 is formed on one of the upper side wall sections 42a of the four upper side wall sections 42 and is configured with a height that is less than the height of the other three upper side wall sections 42. An animal that uses the system toilet 1 for animals may enter and leave the upper receptacle 4 from the gateway part 43.

The excrement receptacle 2 and the upper receptacle 4 may be configured by use of various materials such as woods, metals, or plastics. Of such materials, the use of a plastic is preferred in light of the problem of the production of an offensive smell resulting from seepage of excrement into the inner portion of the material, or the problem of corrosion caused by excrement. The plastic may include a material such as polyethylene, polypropylene, vinyl chloride resin, polystyrene, an ABS resin, an AS resin, polyester resin (polyethylene terephthalate or the like), a polyamide resin, and a polycarbonate resin or the like.

As illustrated in FIG. 1 and FIG. 2, the liquid-permeable panel 3 is disposed on the upper surface side of the support section 41 of the upper receptacle 4 and covers substantially the whole region on the upper surface of the support section 41. In the present embodiment, the liquid-permeable panel 3 is formed in an elongated shape that is approximately half of the size of the support section 41, and the upper surface of the support section 41 is covered with two liquid-permeable panels 3. The longitudinal direction of the liquid-permeable panel 3 is disposed along the direction of extension of the upper side wall section 42a forming the gateway part 43 of the upper receptacle 4.

The liquid-permeable panel 3 described above includes predetermined liquid-permeable characteristics, and preferably predetermined water-absorption characteristics. The details of the liquid-permeable panel 3 will be described below.

Figure 4:
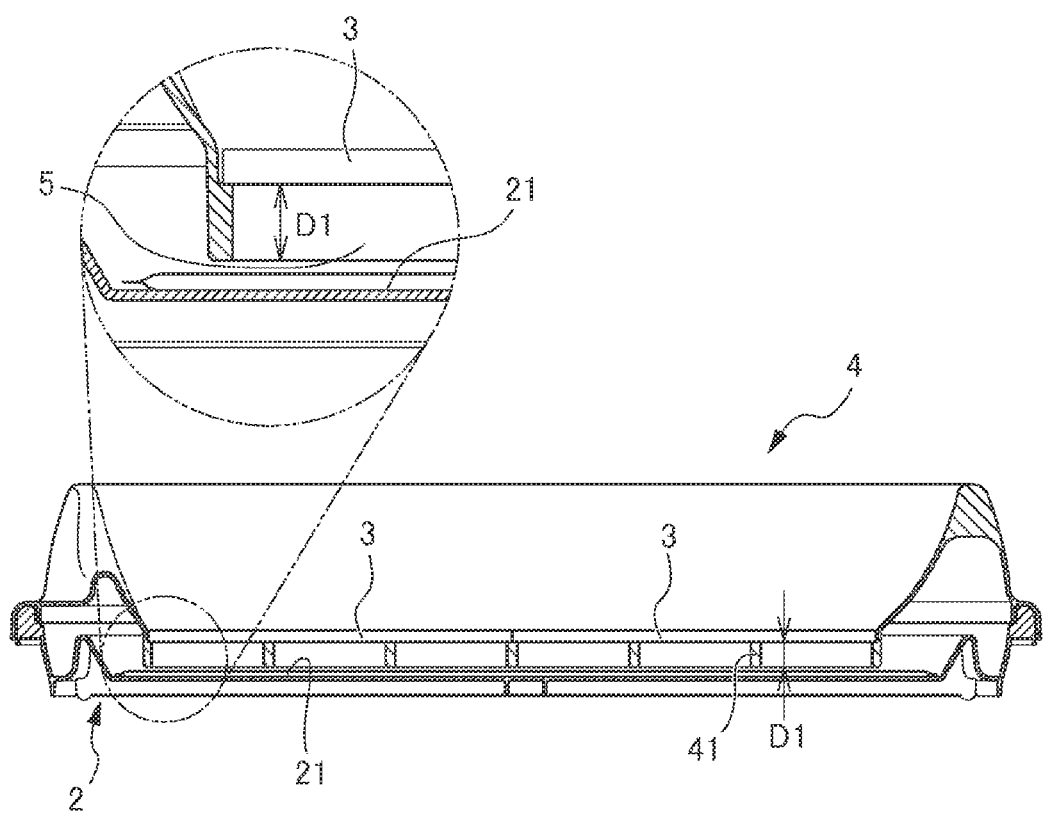
FIG. 4 is a sectional view of a system toilet for animals along the line A-A in FIG. 1 of the system toilet for animals according to the present embodiment.

As illustrated in FIG. 2 and FIG. 4, the system toilet 1 for animals as described above disposes the upper receptacle 4 on an upper section of the excrement receptacle 2 in a state in which the liquid-absorbent sheet 6 is contained in the excrement containment section 21 and is used by mounting the liquid-permeable panel 3 on the support section 41 of the upper receptacle 4.

As illustrated in FIG. 4, in this state, the support section 41 is disposed between the excrement containment section 21 and the liquid-permeable panel 3, and therefore a predetermined space 5 is formed between the excrement containment section 21 and the liquid-permeable panel 3.

The excrement containment section 21 in the excrement receptacle 2 may include a retractable tray that is insertable or retractable in a horizontal direction in the bottom section of the excrement receptacle 2. The retractable tray in this configuration is used either by containing excrement, or is used with the liquid-absorbent sheet 6 laid in an inner section of the retractable tray. Cleaning of the excrement containment section 21 is extremely easy due to provision of the retractable tray. It is preferred to provide a handle to facilitate removal of the retractable tray from the excrement receptacle 2. There is no particular limitation on the shape of the handle as long as the retractable tray can be gripped.

Figure 5:
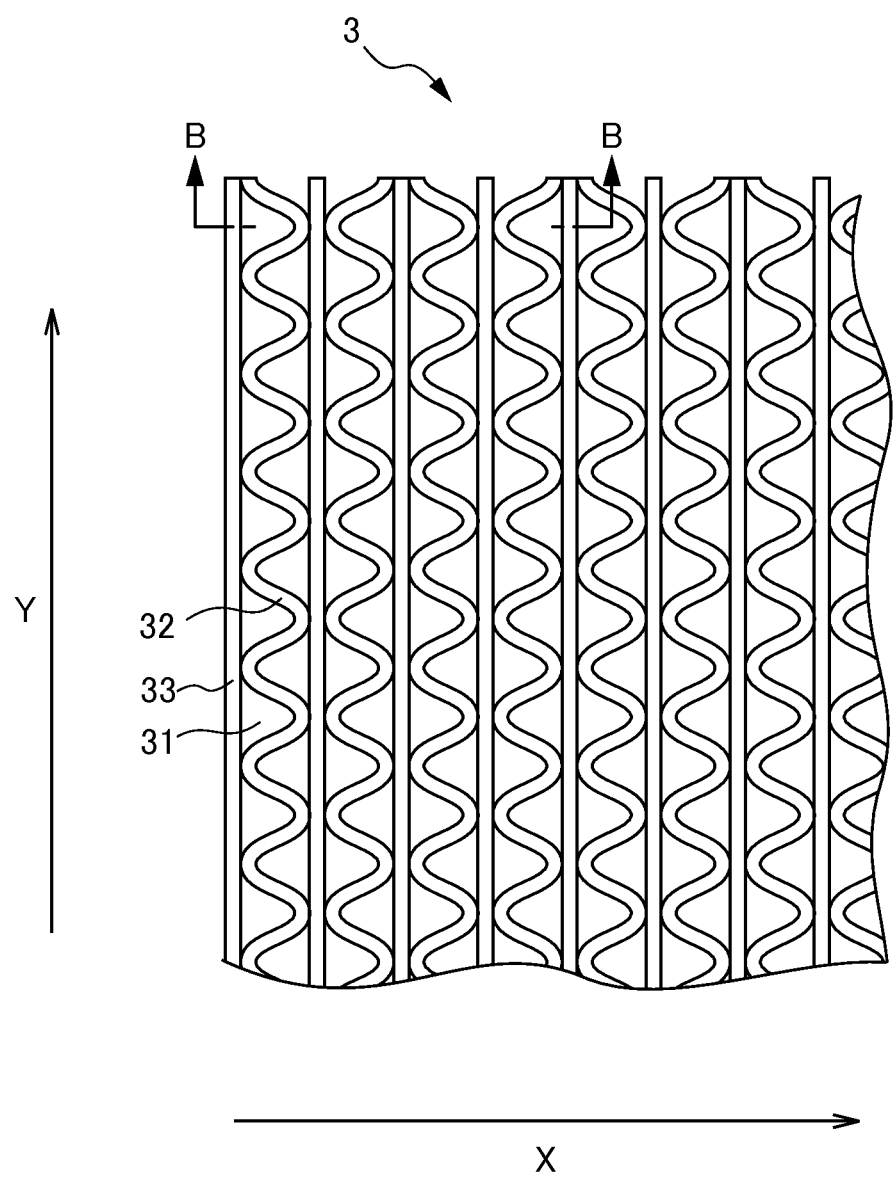
FIG. 5 is an upper view of a liquid-permeable panel used in the system toilet for animals according to the present embodiment.

There is no particular limitation in relation to the shape of the opening on the upper section of the excrement receptacle 2, and selection is possible from a variety of shapes including square, rectangular, trapezoid, oval, circular, or semicircular shapes in view of design. The shape of the opening on the upper section of the excrement receptacle 2 is preferably square or rectangular to thereby avoid waste of material when cutting and processing the liquid-permeable panel 3 from a large water-absorbent panel. Disposable Liquid-Permeable Panel Next, the disposable liquid-permeable panel 3 will be described. The liquid-permeable panel 3 is configured overall as a flat panel. As illustrated in FIG. 1 and FIG. 2, the liquid-permeable panel 3 is configured to be detachable with respect to the upper receptacle 4 to thereby cover substantially the whole surface of the open section of the excrement receptacle 2. More specifically, as illustrated in FIG. 5, the liquid-permeable panel 3 is configured so that the plurality of sheet members (a corrugated sheet 32 and a flat sheet 33 described later) is disposed along the direction of thickness, and adjacent sheet members are bonded at predetermined positions to form. In other words, the liquid-permeable panel 3 is a porous panel including a wall section that is continuously formed by the sheet member and a plurality of holes 31 that is formed by spaces enclosed by the wall section to penetrate in the direction of thickness.

The material used in the panel of the liquid-permeable panel 3 is configured to enable preferred permeation of excrement. An actual example of a material preferably employs paper made from pulp or the like, but however is not limited in this respect. For example, urethane foam may be used that includes an open-cell structure in the direction of thickness in order to impart liquid-permeable characteristics. Urethane foam that is configured with a closed-cell structure is not suitable since it lacks liquid-permeable characteristics.

Although the thickness of the liquid-permeable panel 3 differs in response to the configuration of the panel and the material used in the panel, typically the thickness is configured as 3 mm to 25 mm, and preferably 3 mm to 10 mm. When the thickness of the liquid-permeable panel 3 is excessively small, passage of excrement into the excrement containment section 21 is prevented by deformation of the panel, and there is a risk that the panel may be ruptured by the weight of the animal. When the thickness of the liquid-permeable panel 3 excessively large, the absorption amount of excrement of the liquid-permeable panel 3 from a single excretion is increased and thereby shortens the exchange cycle and bulkiness is increased when storing the panel for use in exchange operations.

As illustrated in FIG. 5, the liquid-permeable panel 3 preferably includes a plurality of holes 31 that penetrates in the direction of thickness and enables passage of excrement through the plurality of holes 31 in the direction of thickness of the liquid-permeable panel 3. The shape and the surface area of the openings of the plurality of holes may be the same or different. In comparison to a panel that is provided with holes that extend in an irregular direction such as a sponge material, the liquid-permeable panel 3 that includes the plurality of holes 31 facilitates a reduction in the amount of residual excrement in the inner portion of the disposable liquid-permeable panel 3 and suppress wetting of the animal feet due to the animal standing on the liquid-permeable panel 3.

When the liquid-permeable panel 3 includes a plurality of holes 31 that penetrate in the thickness direction of the liquid-permeable panel 3, the average surface area of the openings of the plurality of holes 31 is preferably 10 mm$^2$/hole(unit) to 100 mm$^2$/hole, and more preferably 15 mm$^2$/hole to 60 mm$^2$/hole. When the average surface area of the openings of the plurality of holes 31 is excessively small, the amount of excrement that attaches to the liquid-permeable panel 3 increases and suppression of wetting of the feet of the animal becomes difficult. An excessively large average surface area of the openings of the plurality of holes 31 is not preferred since there is a need to increase the thickness of the liquid-permeable panel 3 to impart sufficient strength to the liquid-permeable panel 3. There is no particular limitation in relation to the measurement method of the average surface area of the openings of the plurality of holes 31, and various methods may be used. For example, measurement can be performed using a method of image analysis of a photograph of the openings.

A liquid-permeable panel 3 with a corrugated honeycomb structure is preferred in light of facilitating manufacture and cost-effective acquisition. The corrugated honeycomb structure imparts the liquid-permeable panel 3 with a plurality of holes 31 that penetrate in the thickness direction.

Figure 6:
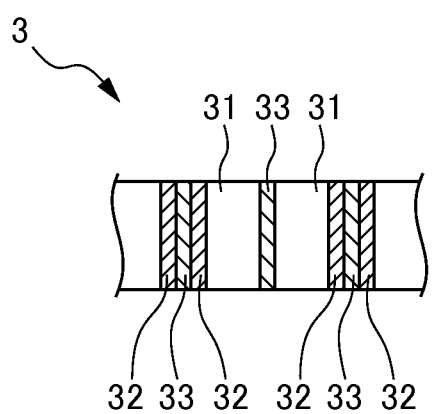
FIG. 6 is a sectional view of the liquid-permeable panel 3 along the line B-B in FIG. 5 of the liquid-permeable panel used in the system toilet for animals according to the present embodiment.

The liquid-permeable panel 3 having a corrugated honeycomb structure will be described below in detail making reference to FIG. 5 and FIG. 6. FIG. 6 is a sectional view of the liquid-permeable panel 3 along the line B-B in FIG. 5. Firstly, the corrugated sheet 32 and the flat sheet 33 are bonded to thereby manufacture a liquid-permeable panel 3 having a corrugated honeycomb structure. The corrugations of the corrugated sheet 32 are imparted to a material by use of a machine termed a corrugator. There is no particular limitation on the method of bonding the corrugated sheet 32 and the flat sheet 33, and suitable selection may be made from various bonding methods such as a bonding method that uses an adhesive agent. However a resin-based adhesive agent with strong water resistance is preferred.

Next, a member formed by bonding the corrugated sheet 32 and the flat sheet 33 is adhered in a plurality of laminated layers. It is preferred that this configuration also uses adhesion with a resin-based adhesive agent with strong water resistance. In this manner, a block obtained by laminating the member obtained by bonding the corrugated sheet 32 and the flat sheet 33 is cut to a suitable size in a direction that is parallel to the direction of penetration of the holes 31. The liquid-permeable panel 3 having a corrugated honeycomb structure is completed by slicing in a suitable thickness that is perpendicular to the direction of penetration of the holes 31. The completed liquid-permeable panel 3 having a corrugated honeycomb structure includes holes 31 enclosed by the corrugated sheet 32 and the flat sheet 33.

Compressive Strength of Liquid-Permeable Panel

A side-surface 1 cm compression deformation load (referred to below simply as the "compressive strength") of the liquid-permeable panel 3 is preferably a compressive strength when measured using the method stated in compressive strength experiment 1 in the examples below and is at least 0.35 N and no greater than 20 N, and preferably at least 5 N and no greater than 15 N. Wetting with urine as a result of torsion or folding over of the sheet in the system toilet for animals can be prevented by use of the disposable liquid-permeable panel 3 that has the resulting compressive strength. Blockage of the holes can be prevented at the same time.

The compressive strength described above may exhibit a difference on both side surface pairs of the liquid-permeable panel 3. Anisotropic characteristics may result from the structure of the liquid-permeable panel 3, and for example, with reference to the direction of lamination X and the direction of non-lamination Y in FIG. 5, the relationship "compressive strength in X direction">"compressive strength in Y direction" is normally satisfied. In the present embodiment, it is preferred that at least one of the above directions is within the above range, and more preferred that both directions are in the above range. When the relationship "compressive strength in X direction">"compressive strength in Y direction" is satisfied as in the present embodiment, a load when an animal such as a dog jumps into the toilet can be supported due to the fact that the X direction coincides with the entry direction Z of the animal into the toilet for animals. When viewed in this configuration, the compressive strength of the greater of either the X direction or the Y direction is most preferably at least 10 N.

The liquid-permeable panel 3 in the present embodiment achieves both a high liquid permeation rate as described above and compressive strength from the side-surface direction. Liquid Permeation Rate of Liquid-Permeable Panel The liquid permeation rate of the liquid-permeable panel 3 is preferably at least 90% and still more preferably at least 93%. Use of the liquid-permeable panel 3 that has the above liquid permeation rate enables a reduction in the attachment of urine to the liquid-permeable panel 3 after excretion and inhibits wetting of the feet of the animal due to standing or dispersion of urine in the inner section. The liquid permeation rate of the liquid-permeable panel 3 may be measured by the following method.

Measurement Method of Liquid Permeation Rate

A tray measured in advance with a weight (A) is placed below a test sample for measurement of the liquid permeation rate of the liquid-permeable panel 3 or the like. The weight of artificial urine (B) is measured by measurement of approximately 30 ml of artificial urine. A circular cylinder having an inner diameter 60 mm is placed on the sample and artificial urine is dripped uniformly onto an inner side of the circular cylinder. The weight (C) of the tray containing the artificial urine is measured upon stopping of the liquid drops of artificial urine from the sample. The value for the liquid permeation rate is calculated using the formula below. The artificial urine uses the composition in the examples described below.

Formula for Calculation of Liquid Permeation Rate $$\text{Liquid Permeation Rate (\%)} = (\text{weight }(C) - \text{weight }(A)) \div \text{weight }(B) \times 100$$

The configuration of the liquid-permeable panel for use in the system toilet for animals enables passage of a large amount of the excrement through the liquid-permeable panel 3 to the excrement containment section 21. Consequently, wetting of the feet by excrement can be suppressed. Therefore, since the liquid-permeable panel 3 is configured detachably with respect to the support section 41, even when soiled by absorption of urine or blockage with feces, simple exchange is possible. Therefore cleaning operations of the system toilet 1 for animals is extremely simple.

Furthermore a space 5 is formed between the liquid-permeable panel 3 and the excrement containment section 21. Consequently, even when a large amount of urine discharge is present, the urine passes through the holes in the liquid-permeable panel 3, disperses on the rear surface, and then is absorbed by the excrement absorption component 6. In other words, by the space 5, backflow of the urine and overflow of the holes causing residual urine on the surface of the liquid-permeable panel 3 can be effectively prevented. In this manner, wetting of the feet of the animal can be suppressed.

The system toilet 1 for animals according to the present invention is not limited to the above embodiment, and suitable modifications may be implemented to a degree that does not depart from the spirit of the invention. For example, a hood of a desired shape may be provided on the upper section of the excrement receptacle 2 in the system toilet for animals according to the above embodiment. The provision of the hood prevents soiling to the circumference of the system toilet 1 for animals resulting from fly of excrement on the surface of the liquid-permeable panel 3.

The corrugated sheet 32 in the liquid-permeable panel 3 of the system toilet 1 for animals according to the present embodiment is configured as a curved sheet. However the corrugated sheet 32 may be configured as a sheet that is folded in a zigzag configuration. The shape of the opening of the holes 31 is not limited to the above, and for example, may be hexagonal or circular. An arbitrary shape may be suitably selected as long as the dimensions of the opening fall within the predetermined range described above and the holes penetrate in the thickness direction.

In substitution for the lattice-shaped porous plate that configures the support section 4 of the system toilet 1 for animals according to the present embodiment, a punching plate provided with regular circular openings, a porous plate provided with a plurality of parallel slits, or a reticulated plate may be used.

The system toilet 1 for animals according to the present invention may be used as a toilet for animals that are kept as a pet such as a dog, cat or a rabbit, and in particular is suitably used as a toilet for a dog that is kept indoors.

EXAMPLES

Although the present invention is described in detail hereafter making reference to the examples, the present invention is not thereby limited to the examples.

Examples 1 to 4, Comparative Examples 1 to 3

As described below, the following experiments 1 and 2 were conducted as compressive strength experiments in relation to a paper-based liquid-permeable panel material, urethane, and a non-woven fabric in accordance with the following method. The results of the experiments are shown in Table 1 and Table 2.

Paper-based liquid-permeable panel (Example 1): An A-flute single-sided cardboard formed from ONBS water-resistant base paper commercially available from Oji Itagami Co., Ltd. (basis weight 180 g/m$^2$) is laminated, cut, and processed into a corrugated honeycomb configuration illustrated in FIG. 5. The average surface area of the hole openings is 16 mm$^2$/hole. The resulting product was cut into 5 cm×12 cm.
Urethane: (Examples 2 to 4): Urethane foam having a thickness of 3 mm, 7 mm and 10 mm was cut into 5 cm×12 cm.
Non-woven Fabric (Comparative Examples 1 to 3): A non-woven fabric having respective basis weights of 35 g/m$^2$, 70 g/m$^2$, and 100 g/m$^2$ was cut into 5 cm×12 cm.
Compressive Strength Experiment 1

(1) The test material is fixed, and a load is applied at a velocity of 500 mm/min from the horizontal direction of the test material (the direction that is perpendicular to the direction of thickness) using a circular plunger having a distal end with a diameter of 10 mm by application to the side surface of the test material until the test material undergoes a deformation of 1 cm. In Example 1, measurement is performed in relation to the load applied in both directions that are the X direction (direction of lamination) illustrated in FIG. 5, from the 12 cm side surface and the Y direction (direction of non-lamination), from the 5 cm side surface. In other examples and comparative examples, the load is applied to the 5 cm side length of the test material.

(2) The peak load is measured using a digital force gauge. Four respective loads are measured in relation to the test samples and an average value (N) is shown in Table 1.

Composition of Artificial Urine
Urea 400 g
Sodium chloride 160 g

TABLE 1

(Compression Strength Experiment 1)

| Example 1 (N) | | Examples 2 to 4 (N) | | | Comparative Examples 1 to 3 (N) | | |
|---|---|---|---|---|---|---|---|
| Lamination direction | Non-lamination direction | 3 mm thickness | 7 mm thickness | 10 mm thickness | 35 g/m² basis weight | 70 g/m² basis weight | 100 g/m² basis weight |
| 12.50 | 9.59 | 0.00 | 0.41 | 1.13 | 0.00 | 0.00 | 0.00 |

Compressive Strength Experiment 2

(1) A test sample is disposed on the toilet surface and actual use by a small dog having a weight of approximately 3 kg was performed.

(2) A result in which no torsion or folding over is observed during one-day use is denoted by ○, a result in which a single torsion or folding over of at least 1 cm is observed is denoted by Δ, and a result in which two or more torsion or folding over events of at least 1 cm are observed is denoted by X. The results are shown in Table 2.

TABLE 2

(Compression Strength Experiment 2)

| Example 1 (N) | | Examples 2 to 4 (N) | | | Comparative Examples 1 to 3 (N) | | |
|---|---|---|---|---|---|---|---|
| Lamination direction | Non-lamination direction | 3 mm thickness | 7 mm thickness | 10 mm thickness | 35 g/m² basis weight | 70 g/m² basis weight | 100 g/m² basis weight |
| ○ | ○ | X | Δ | ○ | X | X | X |

As shown in Table 1 and Table 2, a compressive strength of approximately at least 0.35 N, and preferably at least 1 N produces a preferred compressive strength in response to pressure from the horizontal direction resulting from mounting of a small 3 kg dog. The paper-based liquid-permeable panel in Example 1 exhibits sufficient compressive strength in both the direction of lamination and the direction of non-lamination. The urethane foam exhibits a preferred compressive strength when the thickness is at least 10 mm. The non-woven fabric in Comparative Examples 1 to 3 is often employed as a pee pad. However it can be seen that no compressive strength is exhibited in relation to pressure from the horizontal direction.

As shown in Table 1 and Table 2, it can be seen that the paper-based liquid-permeable panel having a corrugated honeycomb structure in Example 1 exhibits a stronger compressive strength in the direction of lamination. When using this liquid-permeable panel in a system toilet for animals, for example, an entrance for a dog is provided on the low wall in a section of the upper side wall sections 42 to thereby regulate the direction of entry of the dog. It can be seen that torsion in response to a greater compressive force can be prevented since the direction of application of a compressive force resulting from mounting of the dog coincides with the direction of lamination of the corrugated honeycomb structure of the liquid-permeable panel 3.

Artificial urine having the following composition is used in Example 5, Example 6 and Comparative Example 4 described below.

Magnesium sulfate (heptahydrate) 16 g
Calcium chloride (dihydrate) 6 g
Adjust above with water to make total of 20 L.
Add 2 g of Blue No. 1 to add color to adjusted liquid.

Example 5, Example 6 and Comparative Example 4

In accordance with the method described below, a liquid permeation rate experiment and a feet wetting experiment (experiment to evaluate the tendency for wetting of the feet) were conducted on respectively five occasions in relation to the following paper-based liquid-permeable panel material, the non-woven fabric liquid-permeable panel material, and a plastic draining board. The results for the liquid permeation rate experiment are shown in Table 3 and those for the feet wetting experiment are shown in Table 4.

Liquid-Permeable Panel Material

Paper-based Liquid-Permeable Panel (Example 5): New Rencoat is used as a base paper and an A-flute cardboard is processed into a corrugated honeycomb structure (basis weight 130 g/m²) with an average surface area of the hole openings of 16 mm²/hole. Non-Woven Fabric Liquid-Permeable Panel (Example 6): A deodorizing paper using polyester fibers containing activated carbon is used as a base paper, and an A-flute cardboard is processed into a corrugated honeycomb structure (basis weight 210 g/m²), the average surface area of the hole openings is 10.5 mm²/hole, and includes 4.8% addition of a paraffin-based hydrophobic agent. The plastic draining board (Comparative Example 4): mesh tray (polypropylene, shape of openings: vertical 6 mm×horizontal 6 mm, horizontal crosspiece thickness: 3.5 mm, vertical crosspiece thickness 3.5 mm).

Liquid Permeation Rate Experiment

A tray that has a premeasured weight (A) is placed below a test sample for measurement of the liquid permeation rate. The weight of artificial urine (B) is measured by measurement of approximately 30 ml of artificial urine. A circular cylinder having an inner diameter 60 mm is placed on the sample and artificial urine is dripped uniformly onto an inner side of the circular cylinder. The weight (C) of the pan containing the artificial urine is measured upon stopping of the liquid drops of artificial urine from the sample. The value for the liquid permeation rate is calculated using the formula below. Formula for Calculation of Liquid Permeation Rate Liquid Permeation Rate (%)=(weight (C)−weight (A))÷weight (B)×100

Feet Wetting Experiment

A circular cylinder having an inner diameter 60 mm is placed on the sample of the disposable liquid-permeable panel 3, and 30 ml of artificial urine is dripped uniformly onto an inner side. After dripping of the artificial urine, the cylinder is removed and allowed to stand for 30 minutes. The weight (A) of 10 cm×10 cm sheets of filter paper (two types in accordance with JIS P3801) is measured. After 30 minutes, the 10 cm×10 cm sheets of filter paper are placed on the position of dripping of artificial urine on the material of liquid-permeable panel 3, and allowed to stand for 5 seconds. After 5 seconds, the filter paper is removed, and the weight of the filter paper (B) is measured. The experimental results for feet wetting are calculated using the following formula.

Feet Wetting Calculation Formula

Feet Wetting (g)=weight (B)−weight (A).

TABLE 3

(Results of Permeation Rate Experiment)

| | Example 5 Paper-based liquid-permeable panel | Example 6 Non-woven fabric liquid-permeable panel | Comparative Example 4 Plastic draining board |
|---|---|---|---|
| First Time | 95.3% | 90.8% | 96.6% |
| Second Time | 95.9% | 93.1% | 99.6% |
| Third Time | 95.2% | 93.2% | 96.0% |
| Fourth Time | 95.2% | 93.8% | 96.1% |
| Fifth Time | 93.0% | 93.2% | 95.7% |
| Average Value | 94.9% | 92.8% | 96.8% |

TABLE 4

Results of Feet Wetting Experiment

| | Example 5 Paper-based liquid-permeable panel | Example 6 Non-woven fabric liquid-permeable panel | Comparative Example 4 Plastic draining board |
|---|---|---|---|
| First Time | 0.00% | 0.01% | 0.13% |
| Second Time | 0.01% | 0.01% | 0.16% |
| Third Time | 0.00% | 0.11% | 0.11% |
| Fourth Time | 0.01% | 0.03% | 0.17% |
| Fifth Time | 0.02% | 0.00% | 0.11% |
| Average Value | 0.01% | 0.03% | 0.14% |

Table 4 of Comparative Example 4 shows that a plastic drain board enables suitable permeation of artificial urine. However, the results for a plastic draining board in the feet wetting experiment exhibit attachment of a large amount of residual artificial urine on the draining board to the filter paper.

On the other hand, it can be seen that the liquid-permeable panel 3 exhibits excellent liquid permeation characteristics in Example 5 and Example 6 that use a liquid-permeable panel 3 formed in a corrugated honeycomb shape made of paper or a non-woven fabric. Consequently, use of the liquid-permeable panel 3 of Example 5 and Example 6 enables permeation of the liquid-permeable panel 3 by a large amount of artificial urine, and the slight amount of artificial urine that remains on the liquid-permeable panel 3 is absorbed by the liquid-permeable panel 3. Therefore, it can be seen that almost no artificial urine is attached to the filter paper as shown by Table 5 in the feet wetting experiment.

It can be seen that a paper-based liquid-permeable panel having a corrugated honeycomb structure as shown by Table 1 to Table 4 is suitable as a liquid-permeable panel configured to cover the excrement containment section of the system toilet for animals due to high liquid permeation characteristics and high compressive strength.

The invention claimed is:

1. A system toilet for animals comprising:
an excrement receptacle having an excrement containment section,
an upper receptacle disposed on an upper section of the excrement receptacle, including a bottom surface that is configured to cover the upper section of the excrement receptacle, and
a liquid-permeable panel disposed detachably in an upper space of the excrement containment section and supported by the bottom surface of the upper receptacle, the liquid permeable panel including:
a plurality of corrugated sheets;
a plurality of flat sheets, each adjacent to one of the plurality of corrugated sheets, each of the corrugated sheets and the flat sheets are laminated to each other, and a face in a direction of lamination in which laminations of the plurality of corrugated sheets and the flat sheets increase forms a surface of the liquid permeable panel,
a pair of first side edges extending in the direction of lamination;
a pair of second side edges extending in a direction of non-lamination that is perpendicular to the direction of lamination and along the length of the corrugated and flat sheets; and
a plurality of holes penetrating in a thickness direction of the liquid-permeable panel such that liquid permeates in the thickness direction of the liquid-permeable panel through the plurality of holes,
wherein a compressive strength in the direction of lamination is greater than a compressive strength in the direction of non-lamination, and the liquid-permeable panel is positioned such that the direction of lamination is adapted to coincide with an entry direction of the animal,
the pair of first side edges are disposed to extend from a side of an entrance of the toilet for animals to a rear side,
when a distal end of a plunger that has a diameter of 10 mm applies a force of at least 0.35 N and no greater than 20 N at a velocity of 500 mm/min to a side surface of the liquid-permeable panel a resulting deformation of the liquid-permeable panel, is 1 cm, and
average surface area of the holes is 10 to 100 mm²/hole.

2. The system toilet for animals according to claim 1, wherein the liquid-permeable panel is a corrugated cardboard formed from the plurality of flat sheets and the plurality of corrugated sheets.

3. The system toilet for animals according to claim 1, wherein the plurality of holes are formed by curved portions of the corrugated sheets sandwiched between the flat sheets, and the corrugated cardboard is configured by cutting of a block obtained by lamination of the flat sheets and the corrugated sheets which form the corrugated cardboard in a predetermined thickness in a direction that is perpendicular to the direction of penetration of the holes.

4. The system toilet for animals according to claim 1, wherein the liquid-permeable panel has a liquid permeation rate of at least 90%.

\* \* \* \* \*